United States Patent
Krovi et al.

(10) Patent No.: US 10,069,573 B2
(45) Date of Patent: Sep. 4, 2018

(54) OPTICAL ISING-MODEL SOLVER USING QUANTUM ANNEALING

(71) Applicant: RAYTHEON BBN TECHNOLOGIES CORP., Cambridge, MA (US)

(72) Inventors: Hari Kiran Krovi, Lexington, MA (US); Saikat Guha, Cambridge, MA (US)

(73) Assignee: RAYTHEON BBN TECHNOLOGIES CORP., Cambridge, MA (US)

(*) Notice: Subject to any disclaimer, the term of this patent is extended or adjusted under 35 U.S.C. 154(b) by 0 days.

(21) Appl. No.: 15/424,563

(22) Filed: Feb. 3, 2017

(65) Prior Publication Data

US 2017/0264373 A1    Sep. 14, 2017

Related U.S. Application Data

(60) Provisional application No. 62/306,382, filed on Mar. 10, 2016.

(51) Int. Cl.
| | |
|---|---|
| H04J 14/00 | (2006.01) |
| H04B 10/70 | (2013.01) |
| H04B 10/2557 | (2013.01) |
| H04Q 11/00 | (2006.01) |
| G06N 99/00 | (2010.01) |

(52) U.S. Cl.
CPC .......... *H04B 10/70* (2013.01); *G06N 99/002* (2013.01); *H04B 10/2557* (2013.01); *H04Q 11/0005* (2013.01); *H04Q 2011/0035* (2013.01)

(58) Field of Classification Search
CPC ........ G06N 99/002; G06F 17/11; H03K 3/38; H03K 19/195; H04B 10/70

USPC .......................................................... 398/45
See application file for complete search history.

(56) References Cited

U.S. PATENT DOCUMENTS

| | | | |
|---|---|---|---|
| 2005/0273306 A1* | 12/2005 | Hilton ................... | B82Y 10/00 703/11 |
| 2008/0065573 A1* | 3/2008 | Macready ............... | G06N 7/08 706/19 |
| 2014/0200689 A1 | 7/2014 | Utsunomiya et al. | |

(Continued)

FOREIGN PATENT DOCUMENTS

WO    WO 2015/006494 A1    1/2015

OTHER PUBLICATIONS

Kok, "Lecture Notes on Optical Quantum Computing" retrieved from the Internet: URL:https://arxiv.org/abs/0705.4193v1. May 26, 2007 (17 pgs.).

(Continued)

*Primary Examiner* — Don N Vo
(74) *Attorney, Agent, or Firm* — Lewis Roca Rothgerber Christie LLP

(57) ABSTRACT

A method implemented by an optical circuit, including beam splitter, phase shifters and cross-phase modulators, for solving Ising-model using quantum annealing discretizes a continuous time-dependent Hamiltonian function over a time period T, into a plurality of smaller portions; implements each of said smaller portions with a non-linear optical medium, and iterates over said smaller portions to output a solution of the Ising Hamiltonian problem, using the optical components.

11 Claims, 7 Drawing Sheets

(56) References Cited

U.S. PATENT DOCUMENTS

| | | | | |
|---|---|---|---|---|
| 2015/0006597 A1* | 1/2015 | Troyer | ................. | G06N 99/002 |
| | | | | 708/201 |
| 2016/0283857 A1* | 9/2016 | Babbush | .............. | G06N 99/002 |
| 2017/0024658 A1* | 1/2017 | Utsunomiya | ........ | G06N 99/002 |

OTHER PUBLICATIONS

International Search Report for corresponding International Application No. PCT/US2017/021653, filed Mar. 9, 2017 International Search Report dated Jun. 12, 2017 and dated Jun. 22, 2017 (5 pgs.).

Written Opinion of the International Searching Authority for corresponding International Application No. PCT/US2017/021653, filed Mar. 9, 2017, Written Opinion of the International Searching Authority dated Jun. 22, 2017 (6 pgs.).

Harris, Nicholas C. et al., "Bosonic transport simulations in a large-scale programmable nanophotonic processor"; arXiv:1507.03406 [quant-ph]; Quantum Physics; Jul. 20, 2015, 8pp.

Shapiro, Jeffrey H., "Single-photon Kerr nonlinearities do not help quantum computation", Physical Review A 73, pp. 062305-1-062305-11, 2006.

Venkataraman, Vivek et al., "Phase modulation at the few-photon level for weak-nonlinearity-based quantum computing", Letters, Nature Photonics, vol. 7, Feb. 2013, pp. 138-141.

Chang, Darrick E. et al., "Quantum nonlinear optics—photon by photon", Nature Photonics, vol. 8, Sep. 2014, pp. 685-694.

Carolan, Jacques et al., "Universal linear optics", Research, Quantum optics, Science, vol. 349, Iss. 6249, Aug. 14, 2015, pp. 711-716.

* cited by examiner

OPTICAL ISING-MODEL SOLVER USING QUANTUM ANNEALING

CROSS-REFERENCE TO RELATED APPLICATIONS

This Patent Application claims the benefits of U.S. Provisional Patent Application Ser. No. 62/306,382, filed on Mar. 10, 2016 and entitled "A Proposal For An Optical Ising-Model Solver Using Quantum Annealing," the entire content of which is hereby expressly incorporated by reference.

STATEMENT REGARDING FEDERALLY SPONSORED RESEARCH

This invention disclosure is related to a government contract. The U.S. Government has certain rights to this invention.

FIELD OF THE INVENTION

The disclosed invention generally relates to quantum processing and more particularly to an optical Ising-model solver using quantum annealing.

BACKGROUND

Quantum information is physical information that is held in the state of a quantum system. The unit of quantum information may be a qubit, a two-level quantum system. In contrast to discrete classical digital states, a two-state quantum system can be in a superposition of the two states at any given time. Unlike classical information, quantum information cannot be read without the state being disturbed by the measurement device. Furthermore, in quantum information, an arbitrary state cannot be cloned.

Ising model is a mathematical model of ferromagnetism in statistical mechanics. The model comprises of discrete variables that represent magnetic dipole moments of atomic spins that can be in one of two states (+1 or −1). The spins are typically arranged in a graph, usually a lattice, allowing each spin to interact with its neighbors. The Ising model allows the identification of phase transitions, as a simplified model of reality. A two-dimensional square-lattice Ising model is one of the simplest statistical models to show a phase transition.

The adiabatic theorem is a concept in quantum mechanics which states that a quantum mechanical system prepared in a minimum-energy configuration and subjected to gradually changing external conditions adapts its state so as to always remain in an instantaneous energy-minimizing configuration subject to the external conditions, but when subjected to rapidly varying conditions there is insufficient time for the quantum system to adapt itself which may potentially result in the system making disrete transitions to high-energy states. Adiabatic quantum computation (AQC) relies on the adiabatic theorem to do calculations and is closely related to quantum annealing, which may be regarded as a subclass of AQC.

Quantum annealing is a powerful technique used to determine the solutions of constraint satisfaction problems through the quantum adiabatic theorem. The original proposal of quantum annealing uses a quantum Ising spin glass to encode the constraint satisfaction problems. This has been generalized to adiabatic quantum computation (AQC), which uses a wider class of initial and final Hamiltonians.

The essential idea behind AQC is to encode the solution to the (usually, an optimization) problem into the ground state of a 'final' Hamiltonian $H_P$, initialize a quantum system in the easy-to-prepare ground state of an 'initial' Hamiltonian $H_0$, and tune the Hamiltonian slowly (adiabatically) over a time period T as, $H(t)=(1-t/T) H_0+(t/T) H_P$. If $H_0$ and $H_P$ do not commute, and T is chosen large enough—i.e., $T \sim 1/g^3$, where g is the minimum gap between the energy of the ground state and the first excited state of H(t) over the interval tin (0, T)—then the adiabatic theorem of quantum mechanics guarantees that the system will remain in the ground state of H(t) at all times t and hence the solution to the problem can be read out via a measurement of (the energy of) the system at t=T. AQC further led to the development of the adiabatic model of quantum computing, which was shown to be computationally as powerful as the more well-known circuit model of quantum computing.

There has been significant interest in AQC due to its potential ease of implementation. In particular, there has been progress towards building devices capable of implementing the aforesaid model for a restricted class of $H_P$, for which H(t) corresponds to the Hamiltonian of the Ising model with a transverse magnetic field, sometimes known as the quantum Ising model. This restricted class of AQC is termed quantum annealing. The ground state of the quantum Ising model can encode the solutions of many NP hard optimization problems, and quantum annealing provably converges to the optimal solution of these problems as long as the conditions of the adiabatic theorem are satisfied. It is important to note however that the aforesaid restricted class of Hamiltonians belong to a special class called stoquastic Hamiltonians, which is insufficient to build a universal adiabatic quantum computer. Further, it is not known, for a general Ising model, whether quantum annealing provides any speedup, computational-complexity-wise, over the best-known classical algorithms.

In computational complexity theory, nondeterministic polynomial time (NP) is one of the most fundamental complexity classes. Intuitively, NP is the set of all decision problems for which the instances where the answer is "yes" have efficiently verifiable proofs of the fact that the answer is indeed "yes". More specifically, these proofs have to be verifiable in polynomial time by a deterministic Turing machine. In an equivalent formal definition, NP is the set of decision problems where the "yes"-instances can be accepted in polynomial time by a non-deterministic Turing machine.

Even in the absence of a computational complexity advantage, an all-optical implementation of quantum annealing could arguably be quite attractive—both due to its potential ability to gain a large constant-factor speedup (due to optical modulation bandwidths that could far exceed the clock speeds of an electronic computer), as well as its potential ability to yield large power savings over classical electronic-computing solutions.

Quantum non-linear integrated photonics is a fast progressing field, and SOME recent developments have been made in realizing non-linear self and cross-phase modulation on photonic wave-guides and optical cavities. In a recent work, Gaeta and collaborators demonstrated the realization of cross-phase modulation of $10^{-3}$ radian per photon on a few-photon-bearing optical mode with ns-level response times. (See, cited reference [10] in the enclosed Appendix A, the entire contents of which is expressly incorporated by reference herein). They used rubidium vapor in a hollow-core photonic band gap fiber in a novel geometry that can tightly confine the optical mode over distances much greater than the diffraction length, in order to impart the non-linear phase shift. Further, recent work by Lukin and collaborators demonstrated a non-linear phase shift in a cavity quantum electrodynamics (QED) system, which realized an atom-photon interaction via multiple bounces of a single-photon-bearing mode in an optical cavity. (See, cited reference [11] in the enclosed Appendix A, the entire contents of which is expressly incorporated by reference herein). Finally, Englund and O'Brien, and their collaborators, have made recent advances in fabricating thermally-tuned fast-programmable linear-optical circuits. (See, cited references [12] and [13] in the enclosed Appendix A, the entire contents of which is expressly incorporated by reference herein). That is, nanophotonic circuits that can be programmed to realize arbitrary multi-spatial-mode passive unitary transformations, for example, ones that can be constructed via arbitrary configurations of beamsplitters and phase shifters.

Recently, some Ising models are implemented using injection locked lasers, where the Ising spins are mapped onto one of two (right or left) circular polarizations of an array of coupled slave laser oscillators that are driven by a strong master laser oscillator. In some other design, the Ising spins are mapped to a pair of orthogonal states of an array of coupled optical parametric oscillators. In both designs, the system is initialized in a random low-temperature state, and the Hamiltonian governing the Ising interactions, which is the Ising Hamiltonian without the transverse magnetic-field term is slowly turned on. Unlike in quantum annealing, during that turning-on phase, the system does not reside in the instantaneous Hamiltonian's ground state, but as the temperature is raised, is seen to converge to the energy-minimizing state, thereby obtaining the solution to the Ising problem. The most significant shortcoming of both of these approaches is that the fact that the state of the system always converges to the minimum-energy configuration for any instance of the Ising problem is not proven. In other words, the proposed optical Ising solvers do not converge to the optimal solution.

The approach in the disclosed invention exploits the theory of quantum annealing to propose the design of an Ising solver that provably converges to the optimal solution. Further, the proposed design can potentially be highly scalable to a large number of variables by exploiting recent advances in reconfigurable integrated photonic circuits.

SUMMARY OF THE INVENTION

In some embodiments, the disclosed invention is an optical implementation of quantum annealing using dual-rail-encoded photonic qubits, programmable linear optics and tunable small cross-phase modulation across pairs of spatial modes.

In some embodiments, the disclosed invention is an optical circuit for solving Ising-model using quantum annealing. The optical circuit includes a plurality of optical input ports for receiving a plurality of single photons, respectively; a first plurality of optical programmable beam splitters for splitting the plurality of single photons, respectively to generate a first plurality of split photons; a plurality of optical switches for selecting the first plurality of split photons or output photons output from respective optical output ports of the optical circuit, respectively to generate a plurality of selected photons; a second plurality of optical programmable beam splitters for splitting the plurality of selected photons, respectively to generate a second plurality of split photons; a first plurality of optical linear photon shifting devices for phase shifting of the second plurality of split photons, respectively to generate a first plurality of phase shifted photons; a third plurality of optical programmable beam splitters for splitting the first plurality of phase shifted photons, respectively to generate a third plurality of split photons; a second plurality of optical linear photon shifting devices for phase shifting of the third plurality of split photons, respectively to generate a second plurality of phase shifted photons; and a plurality of optical cross-phase modulators for implementing a quadratic portion of the Ising-model, wherein outputs of the plurality of optical cross-phase modulators are switched by the plurality of optical switches to respective inputs of the second plurality of optical programmable beam splitters or to respective inputs of the optical output ports to be output from the optical circuit, respectively.

In some embodiments, the disclosed invention is a method implemented by an optical circuit for solving Ising-model using quantum annealing. The method includes: discretizing a continuous time-dependent Hamiltonian function over a time period T, into a plurality of smaller portions; implementing each of said smaller portions with a non-linear optical medium, and iterating over said smaller portions to output a solution of the Ising Hamiltonian problem.

In some embodiments, the Hamiltonian function is discretized into said smaller portions, using a Trotter approximation. In some embodiments, the non-linear optical medium is an optical medium within which a multi-spatial-mode dual-rail-encoded beam propagates.

BRIEF DESCRIPTION OF THE DRAWINGS

A more complete appreciation of the present invention, and many of the attendant features and aspects thereof, will become more readily apparent as the invention becomes better understood by reference to the following detailed description when considered in conjunction with the accompanying drawings in which like reference symbols indicate like components.

DETAILED DESCRIPTION

Figure 1:
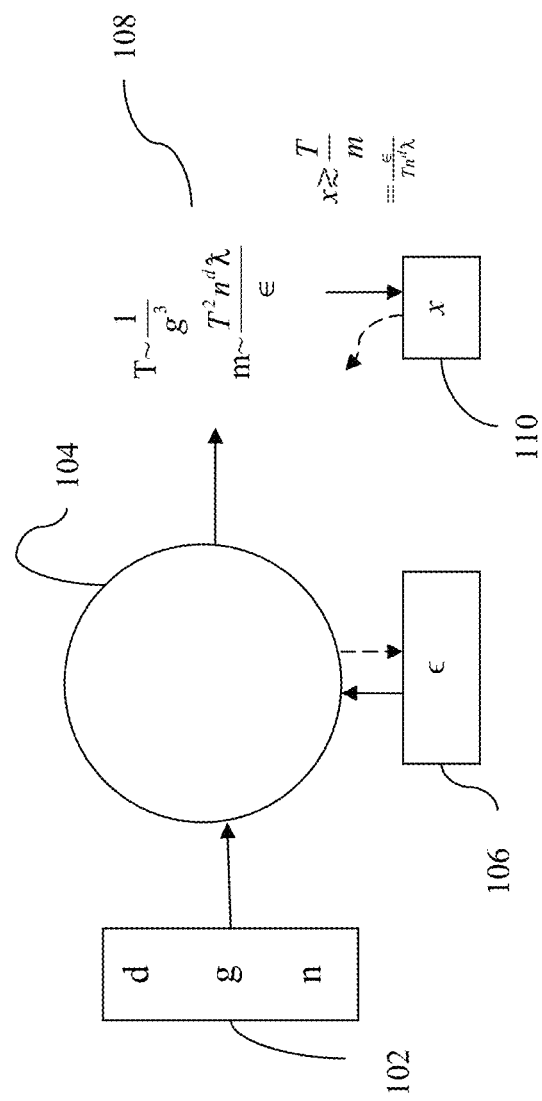
FIG. 1 is a simplified block diagram of a system for solving Ising-model using quantum annealing, according to some embodiments of the disclosed invention.

Devices that can solve the Ising model via quantum annealing—a restricted class of adiabatic quantum computers—have recently gained popularity, since the Ising model can encode many interesting NP hard optimization problems. It is however not yet clear if quantum annealing provides speed up in terms of how the number of computational steps scale as the size of the problem grows, as compared to the best classical algorithms. All quantum annealing architectures realized to date employ 'matter' qubits, such as superconducting, Nuclear Magnetic Resonance (NMR) and Bose-Einstein condensates. Even in the absence of a computational complexity advantage, an all-optical quantum annealer is attractive due to both its ability to gain a large constant-factor speedup, and a potentially large power saving, over conventional electronic-computing solutions.

The Ising model can be used to solve a number of constraint satisfaction problems, which are problems of finding solutions that satisfy all the given constraints. Here we give an example with Exact Cover 3 (EC3), which is a constraint satisfaction problem similar to the more well known 3-SAT. In this problem there are a set of clauses or constraints and each clause contains three bits. The clause is said to satisfied if only one of the three bits is a one and the other two are zero. This problem can be expressed using the Ising model as the following quadratic function of a set of n binary-valued variables (sometimes referred to as 'spins') $s_i = +-1$:

$$H(s_1, \ldots, s_n) = \Sigma_{i=1}^n B_i s_i + \Sigma_{i,j=1}^n J_{ij} s_i s_j, \quad (1)$$

where i and j are the indices for spins. Here $B_i$ is the number of clauses or constraints that contain the bit i in the exact cover 3 (EC3) optimization problem and $J_{ij}$ is the number of clauses that i and j occur together. The spin configuration is then to be found (out of all $2^n$ possible such configurations), i.e., values of $s_1, \ldots, s_n$, that minimizes the 'energy' $H(s_1, \ldots, s_n)$. That is, with given $B_i$ and $J_{ij}$, find $s_i$ that minimize H. The spin-to-spin couplings is typically chosen to be non-zero only on some pairs (i,j). On these pairs, the strength of the couplings $J_{ij}$ are usually not the same. In order to map this problem to a Hamiltonian, we need to map the bits ($B_i$) into spins (qubits).

For example, in the case of a small instance of EC3 on five bits and three clauses, problem specification of the Ising model includes $$\begin{cases} B_i, 1 \leq is = n \\ J_{ij}, 1 \leq i, j \leq n \\ \text{and } n(\# \text{ of bits}) \end{cases}$$

where, $$\begin{bmatrix} B_1 = 2, B_2 = 2, B_3 = 3, B_4 = 1, B_5 = 1 \\ J_{12} = 1, J_{13} = 2, J_{15} = 1, J_{23} = 1, J_{24} = 1, J_{34} = 1, J_{45} \\ n = 5 \end{bmatrix}$$

Now, a bit assignment for the Ising model is calculated as: $x_1, x_2, x_3, x_4, x_5$ (each of these being ±1), where $$\text{s.t. } E = \sum_{i=1}^{5} B_i x_i + \sum_{i,j} J_{ij} x_i x_j$$

is minimized.

This problem is NP hard in general and can be mapped to many interesting problems.

In some embodiments, the disclosed invention breaks up the Hamiltonian into smaller more manageable pieces. For example, Theorem 1 Let $H_{QI}(t)$ denote the quantum Ising Hamiltonian defined above, then it can be approximated to within an error $\epsilon$ by an evolution of the form $U_1 \ldots U_m$, where $$U_k = H^{\otimes n} \exp\left(-i H'_{init} \frac{T}{m}\left(1 - \frac{k}{m}\right)\right) H^{\otimes n} \exp\left(-i H_{final} \frac{T}{m} \frac{k}{m}\right), \quad (17)$$

where $H'_{init} = \Sigma_i \sigma_z^{(i)}$. Here $m = O(T^2 n^d / \epsilon)$, where n is the number of bits in the input and d is a constant that depends on the number of clauses.

"Clauses" in the above theorem refers to the constraints of the EC3 or any other constraint satisfaction problem. Here, $H_{final}$ can be broken into two portions: $B_i$ and $J_{ij}$, as described in Equation (1).

This theorem follows from the known Trotter approximation (also known as split-step Fourier) to break up the Hamiltonian into manageable pieces. Given a cross-Kerr strength $x_0$, the number of steps needed to break up the Hamiltonian evolution and the eventual error are obtained as follow:

$m = O(T/x_0)$, where m is the number of terms (iterations) needed ($i \leq k \leq m$).

$\epsilon \leq x_0 T n^3 \pi$, where x is cross-phase modulation strength (non-linear phase), $\epsilon$ is the error probability in the computation, T is the time needed to run the adiabatic computation (time of evolution), where $T \approx 1/g_{min}^3$, n is the number of qubits in the instance, and $g_{min}$ is minimum energy gap (depends on problem spec.). x can also be specified as available resource→highest x achievable) as $\epsilon$ being specified as the achievable error. For example, m may be about 40,000, $x_0 = 10^{-4}$, n=5, T~4, g~0.647, and $\epsilon$ less than or equal to 0.003.

In some embodiments, the optical circuit of the disclosed invention uses linear optical gates such as beamsplitters and phase shifters and also cross-phase modulators (e.g., cross-Kerr gates). Beamsplitters and phase shifters are generally called passive linear optical elements. They are given by the following Hamiltonians.

$$H_{BS} = \exp(-i \text{ eta}(a^\wedge b + b^\wedge a)), H_{PS} = \exp(-i \text{ theta } a^\wedge a)$$

where a and b are the annihilation operators of the two modes. It can be shown that any passive mode transformation can be decomposed into a network of beamsplitters and phase shifters. Here, a cross-phase modulation (XPM) gate may be used to act on two Hamiltonian modes.

In some embodiments, the disclosed invention is an all-optical implementation of quantum annealing machine including programmable linear optics, for example, beamsplitters, optical tunable phase shifters, and optical in-line cross-phase modulators across pairs of spatial modes, with very small yet tunable non-linear phases. The disclosed invention encodes the general quantum Ising model, and thus converges it to the optimal solution. One way to implement such cross-phase modulation is to employ the optical cross-Kerr effect. Although implementing an in-line cross-Kerr over a pair of single-photon-intensity optical modes propagating in an optical waveguide may be forbidding, the strength of the per-mode cross-phase-modulation can be taken to be very small for the disclosed invention. (See for example, J. H. Shapiro, "Single-photon Kerr non-linearities do not help quantum computation," Phys. Rev. A 73, 062305 (2006)", the entire contents of which is expressly incorporated by reference herein.). Given a cross-phase modulation strength that is realizable, one can make the discretization of the Hamiltonian finer, while still ensuring that the error obtained (due to the space-discretized implementation) remains negligible. In some embodiments, the disclosed invention can be realized scalably using recently proposed designs in integrated photonics.

In some embodiments, the disclosed invention discretizes the tuned Hamiltonian slowly over a time period H(t), into many small pieces using a Trotter approximation, and maps the evolution time T to a spatial extent within a non-linear optical medium within which a multi-spatial-mode dual-rail-encoded beam propagates. In other words, the disclosed invention is based on a discretized adiabatic evolution of the transverse Ising model, rather than the continuous one. It has been shown that the error obtained is negligible as long as certain conditions on the granularity of the discretization are met. An exemplary optical circuit described according to the disclosed invention is capable of solving a 5-bit instance of the exact cover 3 (EC3) optimization problem, although the disclosed invention is not limited to such 5-bit instance and is capable of solving a higher or lower bit instance of the EC3 problem.

Now, in order to implement the Ising Hamiltonian, one needs to first decide on an encoding of the qubits into optical states. In some embodiments, the standard dual-rail-encoding, which encodes each qubit into two modes that share a single photon, is used. This map sends the qubit zero into the state where the photon is in the first mode and the qubit one to the state where the photon is in the second mode. To implement the Hamiltonian, each of the terms of the Hamiltonian is put together. The final Hamiltonian comprises of diagonal terms that can be implemented using phase shifters and cross-Kerr gates.

The first term of the final Hamiltonian is $\Sigma_i B_i Z_i$. The action of this term in the dual-rail encoding is the same as that of a phase shifter. Recall that a qubit is mapped to a photon being in one of two modes; first mode for qubit zero and second mode for qubit one. Now, since the $\sigma_z$ gate acts on the zero qubit as the identity and the one qubit as the negative identity, only one phase shifter is needed to implement it optically. The phase shifter is only on the second mode and puts a phase of $\pi$ in order to act as the negative identity $\Theta = B_i \pi$.

The cross-phase modulator (cross-Kerr gate) simulates the second term of the final Hamiltonian. The second term is $\Sigma_{ij} Z_i Z_j$. This acts on a pair of qubits and in the computational basis, it is essentially a CPHASE gate, i.e., only if both the qubits are one, then it applies a phase of $\pi$ This means that optically, this can be implemented by applying a cross-phase modulator (cross-Kerr gate) on the second modes of the two qubits with a phase of $\pi$ i.e., $x = J_{ij} \pi$.

Figure 2:
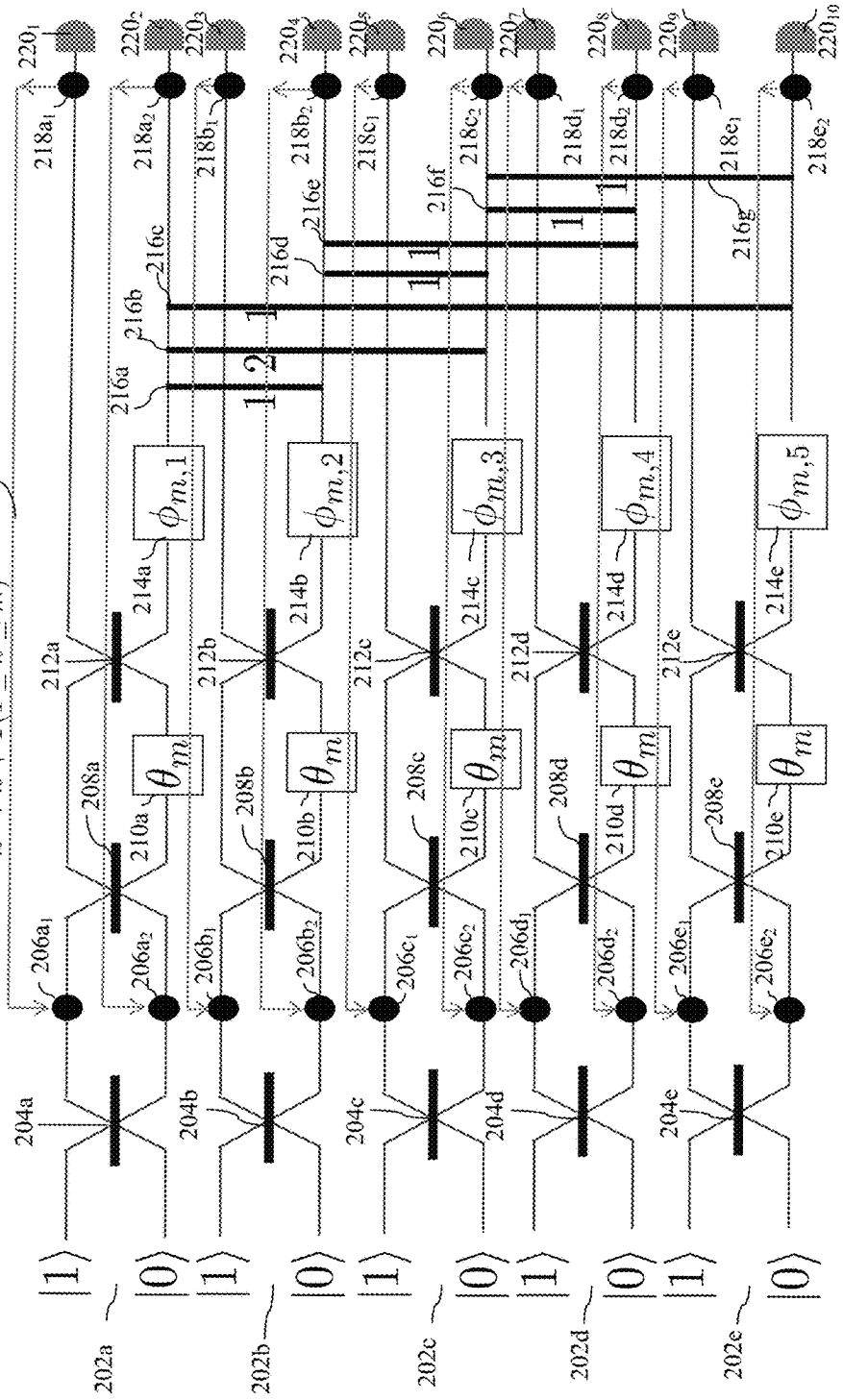
FIG. 2 is a block diagram of an optical circuit for solving Ising-model using quantum annealing, according to some embodiments of the disclosed invention.

In some embodiments, to simulate the initial Hamiltonian, optical beamsplitters are used in the optical circuit of the disclosed invention. The initial Hamiltonian, which on any qubit is $\sigma_x$, can be re-written as H $\sigma_z$ H, where H is the Hadamard gate. The Hadamard gate is a one-qubit rotation, mapping the qubit-basis states $|0\rangle$ and $|1\rangle$ to two superposition states with equal weight of the computational basis states $|0\rangle$ and $|1\rangle$. How to implement a $\sigma_z$ on any qubit is explained above. To implement the initial Hamiltonian, the Hadamard gate needs to be implemented. In the dual-rail basis, the Hadamard gate is a 50:50 beamsplitter on the two modes that make up the qubit. This means that we start with n pairs of modes with a single photon in the first mode and apply 50:50 beamsplitters to all the pairs. An example of this is shown in FIG. 2.

To demonstrate an exemplary optical circuit, a small instance of EC3 on five bits and three clauses is chosen as an example. Suppose the bits are labeled $x_1$ through $x_5$ and consider the three clauses on bits (1,2,3), (2,3,4) and (1,3,5). That is, $B_1$ to $B_5$ are 1, 2, 3, 1 and 1. Similarly, $J_{12}=1$, $J_{13}=2$, $J_{15}=1$, $J_{23}=1$, $J_{24}=1$, $J_{34}=1$ and $J_{45}=1$. Then the Ising problem Hamiltonian is:

$$H = 2s_1 + 2s_2 + 3s_3 + s_4 + s_5 + s_1 s_2 + 2s_1 s_3 + s_1 s_5 + s_2 s_3 + s_2 s_4 + s_3 s_4 + s_4 s_5 \qquad \text{Eq. (16)}$$

It turns out that numerically, one can obtain that the minimum gap of the adiabatic interpolation is 0.647 and this indicates that T must be approximately equal to 4. If one chooses m to be 40,000 (for $x_0 = 10^{-4}$), then the error in this implementation when compared to the continuous implementation is $\epsilon$ less than or equal to 0.0034. This can be implemented by the optical circuit in FIG. 2.

The method finds the ground state of an Ising model Hamiltonian (which is a function of the spins by creating a time-dependent Hamiltonian, breaking it up into smaller pieces that can be assumed to be time-independent and implementing each of these pieces using a multi-spatial mode dual-rail encoded optical circuit consisting of beamsplitters, phase shifters, cross-Kerr devices, optical switches and photon detectors.

FIG. 1 is a simplified block diagram of a system for solving Ising-model using quantum annealing, according to some embodiments of the disclosed invention. As described above, the problem specification for Ising problem may be specified as: problems $\{B_i\}$, $\{J_{ij}\}$, N. This problems specification provides d, g, and n as inputs 102 to the system 104 of the disclosed invention, which in turn, provides the input to the optical circuit depicted in FIG. 2. As explained above, g is the minimum gap between the energy of the ground state and the first excited state of H(t) over the interval tin (0, T), and n is the number of qubits in the instance. The error probability c is also input 106 to the system 104. X in block 110 determines the number of smaller pieces that the problem will be broken into, based on the given parameters.

The optical circuit of the disclosed invention provides a solution to the Ising problem as an output 108 the bit string that corresponds to the solution of the Ising problem and the run time scales as $$T \sim \frac{1}{g^3},$$

as described above. In some embodiments, the optical circuit may include "cross-phase modulation" of adjustable strength, which may be included in the system 104.

FIG. 2 is a circuit block diagram of an optimal receiver, according to some embodiments of the disclosed invention. As illustrated, this example is for a 5-bit EC3 problem, however, as one skilled in the art would recognize, other number of bits are also possible and are within the scope of the disclosed invention. As shown, single photons 202a-202e are input to the optical optimal receiver 200, for example, by a plurality of optical input ports, respectively. The single photons may be generated by a single-photon source and can be in a "1" state meaning a photon in present (e.g., above a threshold value), or in a "0" state meaning the photon is not present (e.g., lower than a threshold value).

Figure 6:
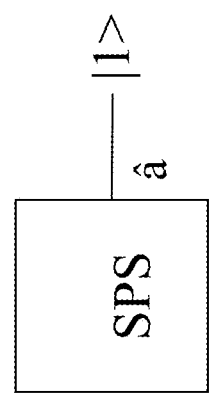
FIG. 6 is a block diagram of an exemplary single-photon source, according to some embodiments of the disclosed invention.

FIG. 6 is a block diagram of an exemplary single-photon source, according to some embodiments of the disclosed invention. Single-photon sources are available as optical components. Parameters characterizing a single-photon source include:

$g^{(2)}(0)$: Purity ($g^{(2)}(0)=0$ is ideal), $\eta_s$: efficiency ($\eta_s=1$ is ideal), and bandwidth (at what rate photons in |1> state can be produced).

The output shown is the quantum state of the output mode $\hat{a}$. |1> means the mode $\hat{a}$ is occupied by exactly 1 photon.

Referring back to FIG. 2, the single photons 202a-202e are then split by respective linear programmable beam splitters 204a-204e to modify the initial state to create a superimposition of the single photon inputs.

Figure 4:
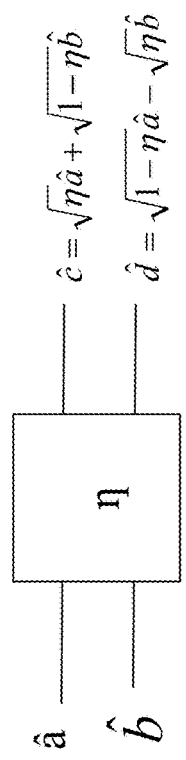
FIG. 4 is a block diagram of an exemplary programmable beamsplitter, according to some embodiments of the disclosed invention.

FIG. 4 is a block diagram of an exemplary programmable beamsplitter, according to some embodiments of the disclosed invention. Programmable beamsplitters are also available as optical components/devices. The depicted 2-mode-input, 2-mode output beam splitter is standard, where $\eta$ is transmissivity and $\eta \in [0,1]$. The inputs and outputs of FIG. 4 are the modes of optical fields. The beamsplitter essentially relates the input modes to the output modes in a linear fashion.

Having linear programmable beam splitters allow encoding different instances of the Ising problem into one programmable (special-purpose) optical computer. In some embodiments, the beamsplitter circuits can be programmed by using thermal tuners (localized heaters that tune the phases).

Referring back to FIG. 2, the split photons are then input to respective optical switches (or optical multiplexors) $206a_1\text{-}206e_2$. Each of the optical switches $206a_1\text{-}206e_2$ select either the split input photon or the output photon output from the respective optical output ports $220_1\text{-}220_{10}$ to go through the required interactions to solve the problem.

Figure 8:
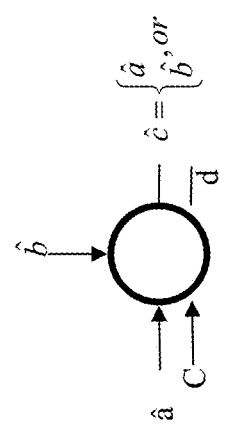
FIG. 8 is a block diagram of an exemplary optical switch, according to some embodiments of the disclosed invention.

FIG. 8 is a block diagram of an exemplary optical switch, according to some embodiments of the disclosed invention. As shown, the optical switch selects one of its inputs, $\hat{a}$ or $\hat{b}$ as its output depending on a signal. In some embodiments, a counter that keeps track of the number of iterations of the circuit decides which of the inputs the optical switch selects. The optical switch may be a switchable mirror known in the art.

Referring back to FIG. 2, the split photon (input photons, or output photons from the previous iteration) are then input to a second set of linear programmable beam splitters 208a-208e to implement the first $H^{\otimes n}$ in Equation (17). The second set of linear programmable beam splitters 208a-208e are similar to exemplary programmable beamsplitters of FIG. 4. The output of the second set of beam splitters 208a-208e are then input to respective linear photon phase shifting elements/devices 210a-210e. Each of the linear photon shifting device 210a-210e imposes a phase shift of $\theta_m$, which is given by $$\theta_m = \frac{T}{m}\left[1 - \frac{k}{m}\right]\pi$$

Here, the Hamiltonian is broken up into m manageable (smaller) pieces (portions) and each piece is labelled by an index k. The phase shift imparted in this piece depends on m and k.

Figure 3:
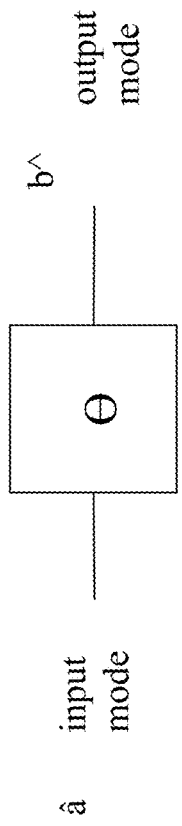
FIG. 3 is a block diagram of an exemplary single-mode (linear) phase shifter, according to some embodiments of the disclosed invention.

FIG. 3 is a block diagram of an exemplary single-mode (linear) phase shifter, according to some embodiments of the disclosed invention. Single-mode (linear) phase shifter are also available as optical components/devices. They can also be implemented by various known methods in integrated photonics, for example, by thermoelectric/piezoelectric timing components. The output is represented as $\hat{b}=e^{i\Theta}\hat{a}$. Input-output relation ($\hat{a}$, $\hat{b}$) are field operators of the input and output modes, respectively. $\Theta$ is the phase shift, where $\theta \in [0,2\pi)$.

Referring back to FIG. 2, the phase shifted photons are then input to a third set of (linear programmable) beam splitters 212a-212e. This third set of beam splitters implement the second $H^{\otimes n}$ in Equation (17). The third set of (linear programmable) beam splitters 212a-212e are similar to exemplary programmable beamsplitters of FIG. 4. The output of the third set of beam splitters 212a-212e are then input to respective linear photon phase shifting elements 214a-214e. The photon shifting elements 214a-214e shift the respective photons by:

$$\phi_{m,i} = B_i \frac{Tk\pi}{m^2}$$

where $B_i$ is the number of constraints that the bit i is contained in.

This phase implements the first portion, that is, $B_i$ of $H_{final}$ in Equation (17) and is dependent on the total number of pieces (portions) the Hamiltonian is being broken up into, i.e., m and $B_i$, as well as the particular piece labelled k.

The output of the photon shifting elements 214a-214e are then input to respective optical cross-phase modulators (cross-Kerr gates) 216a-216g. The cross-phase modulators implement the quadratic part of the Ising Hamiltonian, that is, the second portion, $J_{ij}$ of $H_{final}$ in Equation (17). Such quadratic terms need non-linear interaction between pairs of photons and cross-phase modulation is one way of achieving this.

$$\chi_{ij} = J_{ij} \frac{Tk\pi}{m^2}$$

The strength of the cross-phase modulation depends on the number of pieces that the Hamiltonian is broken up into (i.e., m), the particular piece k and $J_{ij}$, which are the strength of the quadratic term in the Ising Hamiltonian (for the application to EC3, it comes from the number of constraints in which bits i and j appear together).

Figure 7:
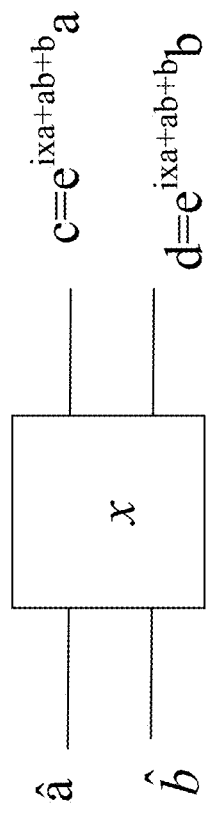
FIG. 7 is a block diagram of an exemplary cross-phase modulator, according to some embodiments of the disclosed invention.

FIG. 7 is a block diagram of an implementation of a cross-phase modulator, according to some embodiments of the disclosed invention. Note that the phase shift performed by a cross-phase modulator on one optical mode (the modulator takes as input two optical modes) is proportional to the intensity (number of photons) of each of its input modes. Cross-phase modulation is a non-linear operation unlike beamsplitters and phase shifters. The effect of cross-phase modulation (which is a two mode operation) imparts a phase to the state in each (photon) mode that depends on the number of photons in each mode i.e., a non-linear phase. The embodiment imparts phases that have a strength x in the two modes.

Figure 5:
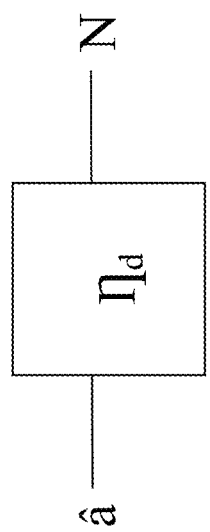
FIG. 5 is a block diagram of an exemplary single-photon detector, according to some embodiments of the disclosed invention.

Referring back to FIG. 2, the outputs of the cross-phase modulators (cross-Kerr gates) 216a-216g are then switched back (or multiplexed) to the respective inputs of the second set of beam splitters 208a-208e as a feedback, or are output by the respective optical ports $220_1\text{-}220_{10}$. Each of the optical switches $218a_1\text{-}218e_2$ direct the output of it respective cross-phase modulators to the respective optical output ports $220_1$-$220_{10}$ or back to the optical switches $206a_1$-$206e_2$ to go through the required interactions to solve the problem. The optical ports $220_1$-$220_{10}$ are similar to the single photon detectors depicted in FIG. 5.

In some embodiments, the disclosed invention discretizes a continuous time-dependent Hamiltonian function over a time period T, into a plurality of smaller portions; implements each of said smaller portions with a non-linear optical medium, and iterates over the smaller portions to output a solution of the Ising Hamiltonian problem.

In some embodiments, the all-optical quantum annealer implementation of the disclosed invention utilizes some of the advances in quantum non-linear integrated photonics, programmable linear optics and tunable quantum non-linear optics in a cavity QED system.

In some embodiments, the disclosed invention is an all-photonic implementation of quantum annealing, a restricted form of quantum computing that can encode the Ising model and thus solve many NP hard optimization and NP complete decision problems, which are computationally hard to do on a classical computer. In some embodiments, the solver according to the disclosed invention converges to the optimal solution. In some embodiments, the optical Ising solver is implementable on an integrated photonic chip, using on-chip programmable linear optics and on-chip quantum non-linear optics. This provides a substantial speed up over classical computing solutions, due to the computations being performed at the speed of light. Some applications of this optical circuit are in solving machine learning, job scheduling and resource allocation problems.

It will be recognized by those skilled in the art that various modifications may be made to the illustrated and other embodiments of the invention described above, without departing from the broad inventive step thereof. It will be understood therefore that the invention is not limited to the particular embodiments or arrangements disclosed, but is rather intended to cover any changes, adaptations or modifications which are within the scope of the invention as defined by the appended drawings and claims.

The invention claimed is:

1. An optical circuit for solving Ising-model using quantum annealing comprising:
   a plurality of optical input ports for receiving a plurality of single photons, respectively;
   a first plurality of optical programmable beam splitters for splitting the plurality of single photons, respectively to generate a first plurality of split photons;
   a plurality of optical switches for selecting the first plurality of split photons or output photons output from respective optical output ports of the optical circuit, respectively to generate a plurality of selected photons;
   a second plurality of optical programmable beam splitters for splitting the plurality of selected photons, respectively to generate a second plurality of split photons;
   a first plurality of optical linear photon shifting devices for phase shifting of the second plurality of split photons, respectively to generate a first plurality of phase shifted photons;
   a third plurality of optical programmable beam splitters for splitting the first plurality of phase shifted photons, respectively to generate a third plurality of split photons;
   a second plurality of optical linear photon shifting devices for phase shifting of the third plurality of split photons, respectively to generate a second plurality of phase shifted photons; and
   a plurality of optical cross-phase modulators for implementing a quadratic portion of the Ising-model, wherein outputs of the plurality of optical cross-phase modulators are switched by the plurality of optical switches to respective inputs of the second plurality of optical programmable beam splitters or to respective inputs of the optical output ports to be output from the optical circuit, respectively.

2. The optical circuit of claim 1, wherein plurality of single photons are generated by single-photon source are either in a "1" state or a "0" state.

3. The optical circuit of claim 1, wherein first, second and third plurality of optical programmable beam splitters are programmable by thermal tuners.

4. The optical circuit of claim 1, further comprising a counter for keeping track of the number of iterations of the optical circuit and deciding which of the two inputs each of the plurality of the optical switches selects.

5. The optical circuit of claim 1, wherein each of the first plurality of optical linear photon shifting devices implement a same constant phase shift.

6. The optical circuit of claim 1, wherein the second plurality of optical linear photon shifting devices implement a phase shift $\Phi_{m,i}$ according to $$\phi_{m,i} = B_i \frac{Tk\pi}{m^2}$$

where $B_i$ is the number of constraints that a bit i is contained in, m is the number of first plurality of split photons, k is a particular piece of the spit photons and T is the time period in which the Ising-model is adiabatically tuned.

7. The optical circuit of claim 1, wherein each of the plurality of optical cross-phase modulators performs a phase shift proportional to the number of photons in each mode of said each cross-phase modulator.

8. The optical circuit of claim 1, wherein each of the plurality of optical cross-phase modulators imparts a phase to a state in each photon mode that depends on the number of photons in each photon mode.

9. A method implemented by an optical circuit for solving Ising-model using quantum annealing with encoded photonic qubits, the method comprising:
   discretizing a continuous time-dependent Hamiltonian function over an evolution time period T, into a plurality of portions, each portion being smaller than the continuous time-dependent Hamiltonian function, wherein each portion is time independent;
   implementing each of said portions with a non-linear optical medium to generate a portion of a solution of the Ising Hamiltonian problem, by mapping the evolution time period to a spatial extent within the non-linear optical medium, wherein the non-linear optical medium encodes each photonic qubit into two modes that share a single photon by using dual-rail-encoding; and
   iterating the discretizing and implementation over each said portions to output the all solution of the Ising Hamiltonian problem.

10. The method of claim 9, wherein the Hamiltonian function is discretized into said portions, using a Trotter approximation.

11. The method of claim 9, wherein the mapping sends a qubit zero into an optical state where the single photon is in a first mode and a qubit one to an optical state where the single photon is in a second mode.

* * * * *